United States Patent
Rao et al.

(10) Patent No.: US 6,410,762 B1
(45) Date of Patent: Jun. 25, 2002

(54) PROCESS FOR THE ISOLATION OF ORYZANOLS FROM RICE BRAN OIL SOAP STOCK

(75) Inventors: Kasturi Venkata Sesha Adinarayana Rao; Bhamidipati Venkata Surya Koppeswara Rao; Narayana Balagopala Kaimal Thengumpillil, all of Hyderabad (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 09/813,109

(22) Filed: Mar. 20, 2001

(51) Int. Cl.$^7$ .................................................. C11B 13/02
(52) U.S. Cl. ........................ 554/192; 554/191; 554/195; 554/198
(58) Field of Search ................................. 554/195, 198, 554/191, 192

Primary Examiner—Deborah Carr
(74) Attorney, Agent, or Firm—Ladas & Parry

(57) ABSTRACT

The present invention relates to a process for the isolation of oryzanols from rice bran oil soap stock by (a) saponifying the oil present in soap stock with an alkali followed by neutralisation of the excess alkali, (b) converting the soap stock into anhydrous, porous soap noodles, (c) extracting the soap noodles with an organic solvent, (d) crystallising the crude unsaponifiable matter to remove impurities, (e) subjecting the residue to column chromatography to obtain an oryzanol rich fraction, and (f) recrystallising the oryzanol rich fraction using an organic solvent to obtain pure oryzanol.

8 Claims, No Drawings

PROCESS FOR THE ISOLATION OF ORYZANOLS FROM RICE BRAN OIL SOAP STOCK

FIELD OF THE INVENTION

The present invention relates to a process for the isolation of oryzanols from rice bran oil soap stock. More particularly, the present invention relates to a process for the isolation of oryzanols from rice bran oil soap stock, obtained during the neutralisation of free fatty acids present in rice bran oil. The normally difficult to handle soap stock is converted into soap nodules which become easier to handle, store and extract. The unsaponifiable matter isolated therefrom by solvent extraction is purified by conventional techniques to isolate oryzanol in 90% purity and 70% yield. The fatty acids are obtained in a purer form than by the conventional method of acid oil splitting of the soap stock.

BACKGROUND OF THE INVENTION

The beneficial physiological effects of oryzanol intake are well documented. The hypocholesterolemic activity of rice bran oil has been shown due to it constituent oryzanols and to other components of unsaponifiable matter [Seetharamaiah G. S., and Chandrashekhar N., *Artherascierosis*, 78, 219 (1989)]. Lipid peroxidation has been shown to be prevented in the retina by gamma oryzanol due to its anti-oxidant property [Heramitsu T. and Armstrong D., *Ophthalmic Res*. 23, 196, (1990)]. Oryzanol emulsions are used as antioxidants and preservatives for cosmetics and foods and such emulsions are also effective in preventing colour changes [Japanese Patent 58,45,728 (1983)]. Pharmaceutical preparations containing oryzanols have been shown to reduce wrinkles in aged women [Japanese patent 05,310, 526 (1993)]. Melamin formation accelarating topical preparations containing oryzanol (1% by weight) have been shown to convert gray hair into natural black [Japanese patent 05,255,037 (1993)]. Nail lacquers containing oryzanols prevent discoloration of nails [Japanese patent 02,290, 806 (1990)]. Deodorant formulations containing oryzanol are especially effective in controlling odor from perspiration and underarms [Japanese patent 6333322 (1988)]. Oryzanol containing pharmaceutical formulations are used in preventing motion sickness [Japanese patent 82,32,229 (1982)] and in the treatment of nervous system disorders [CN 87,101, 519 (1988)]. A plethora of oryzanol containing transdermal pharmaceutical and moisturising cosmetic preparations have been prepared for the treatment of skin disorders [FR 2,688,137 (1993); JP 01, 290,613 (1989; JP 81,161,315 (1981); JP 82, 149, 212 (1982); JP 82,42,621 (1982); JP 59,53,415 (1984); JP 59, 184, 120 (1984)]. Soft capsules containing oryzanols with or without riboflavin butyrate can be used to prevent arteriosclerosis [JP 58,103,315 (1983)]. Batch preparations containing oryzanols (3–20% by weight) are used in the treatment of dermatitis and senile xeroderma [JP 05,279,242 (1993)]. Oryzanols have been shown to be highly effective against lipogenic liver cirrhosis in spontaneously hypertensive rats, an animal having natural abnormalism in lipid metabolism [Ito M., et al., *J. Clin. Biochem. Nutr*., 12, 193 (1992)]. Investigations directed towards the safety assessment of oryzanols clearly indicate that oryzanols possess no genotoxic and carcinogenic initiation activity [Tsushimoto G., et al., *J Toxicol. Sci*., 16, 191 (1991); Tamagawa M., *Food Chem. Toxicol*., 30, 49 (1992)].

Rice bran oil is the most readily accessible source for the isolation of oryzanols. The oryzanol content of rice bran oil varies within the range of 1.1 to 2.6 %. The soap stock obtained by the alkali refining of rice bran oil contains 1.3–3.1 % oryzanols. Oryzanols were first isolated from rice bran oil [Kaneko R., and Tsuchiya T., *J. Chem. Soc. Jpn*. 57, 526, (1954); JP 4895 (1957)] and was presumed to be a single component. Later it was determined to be a mixture containing ferulate (4-hydroxy-3-methoxy cinnamic acid) esters of triterpene alcohols and plant sterols. Individual components were identified as ferulate ester of cycloartenol, 24-methylene cycloartenol, compesterol, beta-sitosterol and other sterols.

Attempts have been made to develop methods for the isolation of oryzanols including isolation of cycloartenol ferulate from plant oil suing selective organic solvents for oryzanol extraction followed by chromatographic purification [JP 6314796 (1988); JP 6314797 (1988)], isolation of oryzanols from rice bran dark oil by precipitating the stearins with aluminium sulfate followed by crystallisation of oryzanols from supernatant [JP 8295942 (1982)], highly concentrated separation of oryzanols from rice bran and rice germ oils by two step alkali treatment [JP 76123811 (1976)], recovery of oryzanols from degummed and dewaxed rice bran oil with silica based simulated moving bed chromatography followed by crystallisation from heptane [Michael S. and Gordon J. R., *J Am. Oil. Chem. Soc*., 75, 1421 (1998)], extraction of rice bran soap stock with diethylether at pH 9.5 followed by its chromatographic purification on a neutral alumina column [Seetharamaiah G. S., and Prabhakar J. V.,*J. Food Sci. Technol*., 23, 270 (1986)], extraction of oryzanols from rice bran oil soap stock with ether after acidification of soap stock with HCI [JP 4895 (1957)], extraction from a soap of rice bran oil by using multiple phase fractional crystallisations [Liu M. and Liu Y., *Tianyan Chanwu Yanjiu yu Kaifa*, 9, 77 (1997)], isolation of oryzanols by transesterification of rice bran oil with methanol and sulfuric acid followed by column chromatography over pretreated Amberlite IRA-401 using mixed solvents, methanol and ether as the eluent [JP 13649 (1961)], liquid-liquid extraction by using hexane and water saturated furfural as the extractant [JP 6812731 (1968)], isolation by passing carbon dioxide gas through a methanolic solution of soap of rice bran oil [JP 6812731 (1968)] and extraction of oryzanols from the raw oils of rice bran and ferment, maize and barley by the distillation of these oils at comparatively low temperature followed by extracting the residue with hydrosol solvents [German Patent 1301002 (1969)]

U.S. Pat. No. 08785357 (1997) [ corresponding to Indian patent 183660 (2000)] discloses the isolation of oryzanols from crude dark rice bran acid oil comprising (a) distillation of free fatty acids from the acid oil using conventional methods, (b) hydrolysing the resultant residue by conventional methods, (c) dissolving the hydrolysed product in water to form oryzanols containing micellar aggregates and adding drop wise aqueous solution of calcium chloride to form precipitate (d) extracting the oryzanols from dried precipitate with polar organic solvent and (e) purifying the oryzanols from the organic extract by column chromatography. During rice bran oil refining a significant amount of oil gets trapped within the soap stock. This soap stock contains about 1.3–3.1% oryzanols. The soap stock or the acid oil derived for it from the starting material is used for the isolation of oryzanols in most of the prior art methods. However, the prior art methods described above are predominantly laboratory procedures and are not easily translated into commercial activity.

It is therefore important to develop a process for the isolation of oryzanols which is capable of commercial adaptation with high yield and high purity.

OBJECTS OF THE INVENTION

The main object of the present invention is to provide an improved process for the isolation of oryzanols from rice bran oil soap stock which is economical.

It is another object of the present invention to simplify the process of isolation of oryzanols from rice bran oil soap stock.

SUMMARY OF THE INVENTION

Accordingly the present invention provides a process for the isolation of oryzanols from rice bran oil soap stock, said process comprising (a) saponifying the oil present in soap stock with an alkali followed by neutralisation of the excess alkali, (b) converting the soap stock into anhydrous, porous soap noodles, (c) extracting the soap noodles with an organic solvent, (d) crystallising the crude unsaponifiable matter to remove impurities, (e) subjecting the residue to column chromatography to obtain an oryzanol rich fraction, and (f) recrystallising the oryzanol rich fraction using an organic solvent to obtain pure oryzanol.

In one embodiment of the invention, the saponification of the oil present in the soap stock is carried out using sodium hydroxide at a temperature in the range of 75–95° C. for a time period in the range of 0.5–4 hours.

In a further embodiment of the invention, the time period for saponification of the oil in the soap stock is preferably 2 hours.

In yet another embodiment of the present invention, the excess alkali is neutralised using sodium bicarbonate or carbon dioxide.

In another embodiment of the invention, the organic solvent used for the extraction of the soap noodles is selected from the group consisting of hexane, chloroform and ethyl acetate.

In yet another embodiment of the invention, the organic solvent used for the removal of waxy impurities from the unsaponifiable matter is selected from the group consisting of hexane, ethyl acetate, acetone, methanol and any mixture thereof.

In another embodiment of the invention, the column chromatography is performed using hexane, chloroform, ethyl acetate or methanol as the eluting solvents.

In a further embodiment of the invention, the purity of the oryzanol is about 90%.

DETAILED DESCRIPTION OF THE INVENTION

The soap stock is converted into light, soft and porous soap noodles which are convenient to handle. Conventional extraction processes using organic solvents are used to recover unsaponifiable matter enriched in oryzanols. The process of the invention avoids the use of high temperature distillation thus avoiding the possibility of decomposition of oryzanols, and the treatment of soap stock as such with organic solvents which results in emulsion problems.

The present process provides an improved method of handling bulk soap stock as soap noodles, extracting the unsaponifiables with conventional solvent extraction procedures and the efficient isolation of oryzanols which enhances the viability of the process commercial exploitation. The removal of non-saponifiable constituents from the soap noodles results in the extracted noodles providing a source of high purity fatty acids. Conventional splitting of the soap stock results in low grade fatty acids.

The invention will be described in greater detail with reference to the following examples, which are given by way of illustration and should not be construed as limiting the scope of the invention.

EXAMPLE 1

About 500 g of soap stock containing 30–35% total fatty matter and 1.6% of oryzanols was treated with alkali (11 g) at 90° C. with constant stirring over a period of 1 hour. The excess alkali in the saponified product was neutralised with carbon dioxide or sodium bicarbonate and the pasty mass was converted into soap noodles using conventional noodle making equipment. The wet noodles were allowed to air dry for about 2 hours followed by drying at 115° C. for 2 hours to obtain 175 g soap noodles. 65 g of these dried noodles were taken in a Soxhlet extractor and extracted with ethyl acetate (750 ml) over a period of 4 hours. Ethyl acetate was evaporated off using a rotary evaporator to recover unsaponifiable matter (9.2 g). This unsaponifiable matter was treated with methanol and ethyl acetate mixture (1: 1, 50 ml) and left at 10–15° C. overnight. A waxy substance (1.25 g) separated out, which was filtered on a filter paper. The precipitate was further washed with cold mother solution (2×50 ml). The combined filtrate was concentrated using a rotary evaporator to get a residue (7.9 g). The residue was purified by silica gel column chromatography using a 4.5×65 cm column with chloroform as eluting solvent to get 3.8 g oryzanol rich fraction. This oryzanol rich fraction was further crystallised from methanol/acetone solution, which on cooling overnight (0–5° C.) gave white crystals of oryzanols (2.1 g). The quantitative UV spectrometric analysis indicated the purity level of isolated oryzanols to be 90%. The recovery of oryzanols based on the starting soap noodles was about 70%. The melting point of the isolated oryzanols was found to be in the range of 120–125° C. The HPLC analysis of purified oryzanols sample was comparable to that of a standard sample.

EXAMPLE 2

65 g of dried noodles prepared as described in Example 1 were taken in a Soxhlet extractor and extracted with ethyl acetate (750 ml) over a period of 4 hours. Chloroform was evaporated off using a rotary evaporator to recover unsaponifiable matter (9.8 g). This unsaponifiable matter was treated with methanol and ethyl acetate mixture (1: 1, 50 ml) and left at 10–15° C. overnight. A waxy substance (0.92 g) separated out, which was filtered on a filter paper. The precipitate was further washed two times with cold mother solution (2×50 ml). The combined filtrate was concentrated using a rotary evaporator to get a residue (8.86 g). The residue was purified by silica gel column chromatography using a 4.5×65 cm column with chloroform as eluting solvent to get 4.22 g oryzanol rich fraction. This oryzanol rich fraction was further crystallised from methanol/acetone solution, which on cooling overnight (0–5° C.) gave white crystals of oryzanols (1.85 g). The quantitative UV spectrometric analysis indicated the purity level of isolated oryzanols to be 90%. The recovery of oryzanols based on the starting soap noodles was about 63%. The melting point of the isolated oryzanols was found to be in the range of 120–125° C. The HPLC analysis of purified oryzanols sample was comparable to that of a standard sample.

EXAMPLE 3

50 g of the dried noodles as prepared in Example 1 were taken in a Soxhlet extractor and extracted with hexane (750 ml) over a period of 4 hours. Hexane was evaporated off using a rotary evaporator to recover unsaponifiable matter (5.53 g). This unsaponifiable matter was treated with methanol and ethyl acetate mixture (1:1, 30 ml) and left at 10–15° C. overnight. A waxy substance (0.80 g) separated out, which was filtered on a filter paper. The precipitate was further washed with cold mother solution (2×30 ml). The combined filtrate was concentrated using a rotary evaporator to get a residue (4.72 g). The residue was purified by silica gel column chromatography using a 4.5×65 cm column with chloroform as eluting solvent to get 2.21 g oryzanol rich fraction. This oryzanol rich fraction was further crystallised from methanol/acetone solution, which on cooling overnight (0–5° C.) gave white crystals of oryzanols (1.27 g). The quantitative UV spectrometric analysis indicated the purity level of isolated oryzanols to be 88%. The recovery of oryzanols based on the starting soap noodles was about 56%. The melting point of the isolated oryzanols was found to be in the range of 120–125° C. The HPLC analysis of purified oryzanols sample was comparable to that of a standard sample.

ADVANTAGES OF THE INVENTION

1. The soap stock is easy to handle since it is in noodle form.
2. Preparation of light, soft and porous noodles is very simple.
3. Soap noodles can be handled in large quantities for bulk extraction in solvent extraction industry where most refineries may be situated.
4. Conversion of huge soap stock obtained during the neutralisation step, into soap noodles reduces effluents at the plant location.
5. The soap noodles can be easily stored.
6. Extraction of unsaponifiable matter from the soap noodles can be continuous or in a batch process.
7. Owing to retention of shape after extraction, the extracted noodles can also be stored without any problems.
8. The extracted noodles provide a source of producing purer fatty acids after acidification than would have been obtained after acidification of raw soap stock.
9. The yeild of oryzanols is good.

We claim:

1. A process for the isolation of oryzanols from rice bran oil soap stock, said process comprising (a) saponifying the oil present in soap stock with an alkali followed by neutralisation of the excess alkali, (b) converting the soap stock into anhydrous, porous soap noodles, (c) extracting the soap noodles with an organic solvent, (d) crystallising the crude unsaponifiable matter to remove impurities, (e) subjecting the residue to column chromatography to obtain an oryzanol rich fraction, and (f) recrystallising the oryzanol rich fraction using an organic solvent to obtain pure oryzanol.

2. A process as claimed in claim 1 wherein the saponification of the oil present in the soap stock is carried out using sodium hydroxide at a temperature in the range of 75–95° C. for a time period in the range of 0.5–4 hours.

3. A process as claimed in claim 1 wherein the time period for saponification of the oil in the soap stock is preferably 2 hours.

4. A process as claimed in claim 1 wherein the excess alkali is neutralised using sodium bicarbonate or carbon dioxide.

5. A process as claimed in claim 1 wherein the organic solvent used for the extraction of the soap noodles is selected from the group consisting of hexane, chloroform and ethyl acetate.

6. A process as claimed in claim 1 wherein the organic solvent used for the removal of waxy impurities from the unsaponifiable matter is selected from the group consisting of hexane, ethyl acetate, acetone, methanol and any mixture thereof.

7. A process as claimed in claim 1 wherein the column chromatography is performed using hexane, chloroform, ethyl acetate or methanol as the eluting solvents.

8. A process as claimed in claim 1 wherein the purity of the oryzanol is about 90%.

\* \* \* \* \*